(12) United States Patent
Vishniac et al.

(10) Patent No.: US 9,875,054 B2
(45) Date of Patent: Jan. 23, 2018

(54) MANAGING OPERATIONS ON STORED DATA UNITS

(71) Applicant: Ab Initio Technology LLC, Lexington, MA (US)

(72) Inventors: Ephraim Meriwether Vishniac, Arlington, MA (US); Stephen J. Schmidt, Medford, MA (US)

(73) Assignee: Ab Initio Technology LLC, Lexington, MA (US)

( * ) Notice: Subject to any disclaimer, the term of this patent is extended or adjusted under 35 U.S.C. 154(b) by 704 days.

(21) Appl. No.: 13/787,203

(22) Filed: Mar. 6, 2013

(65) Prior Publication Data
US 2014/0258652 A1    Sep. 11, 2014

(51) Int. Cl.
*G06F 12/02* (2006.01)
*G06F 3/06* (2006.01)

(52) U.S. Cl.
CPC ............ *G06F 3/064* (2013.01); *G06F 3/0608* (2013.01); *G06F 3/0671* (2013.01)

(58) Field of Classification Search
CPC .................................................. G06F 12/0212
See application file for complete search history.

(56) References Cited

U.S. PATENT DOCUMENTS

| | | | |
|---|---|---|---|
| 6,426,893 B1 * | 7/2002 | Conley et al. | 365/185.11 |
| 6,560,055 B1 | 5/2003 | Nemazie et al. | |
| 6,604,236 B1 | 8/2003 | Draper et al. | |
| 7,882,081 B2 * | 2/2011 | Stager | G06F 17/30067 707/691 |
| 7,890,469 B1 | 2/2011 | Maionchi et al. | |
| 7,937,528 B2 | 5/2011 | Cousins | |
| 7,970,804 B2 | 6/2011 | Tang et al. | |
| 8,045,285 B1 | 10/2011 | Yang et al. | |
| 8,090,691 B2 | 1/2012 | Lynn | |
| 8,156,241 B1 * | 4/2012 | Mukherjee et al. | 709/236 |
| 8,555,053 B1 * | 10/2013 | Vitalo et al. | 713/153 |
| 8,615,500 B1 * | 12/2013 | Armangau | G06F 17/30156 382/232 |
| 8,732,403 B1 | 5/2014 | Nayak | |
| 2005/0080823 A1 | 4/2005 | Collins | |
| 2005/0198062 A1 | 9/2005 | Shapiro | |

(Continued)

OTHER PUBLICATIONS

Oracle, "Hybrid Columnar Compression (HCC) on Exadata," Oracle White Paper, Nov. 2012 (13 pages).

(Continued)

*Primary Examiner* — Charles Rones
*Assistant Examiner* — Ryan Dare
(74) *Attorney, Agent, or Firm* — Occhiuti & Rohlicek LLP

(57) ABSTRACT

A system for managing storage of data units includes a data storage system configured to store multiple data blocks, at least some of the data blocks containing multiple data units, with at least a group of the data blocks being stored contiguously, thereby supporting a first read operation that retrieves data units from at least two adjacent data blocks in the group. The system is configured to perform one or more operations with respect to data units, the operations including a delete operation that replaces a first data block containing a data unit to be deleted with a second data block that does not contain the deleted data unit, with the second data block having the same size as the first data block.

67 Claims, 6 Drawing Sheets

(56) References Cited

U.S. PATENT DOCUMENTS

| | | |
|---|---|---|
| 2006/0184563 A1 | 8/2006 | Potter |
| 2008/0098040 A1 | 4/2008 | Xie |
| 2008/0104149 A1 | 5/2008 | Visniac et al. |
| 2009/0037447 A1 | 2/2009 | Ravikumar et al. |
| 2009/0284400 A1 | 11/2009 | Gui et al. |
| 2009/0287986 A1 | 11/2009 | Vishniac et al. |
| 2009/0327802 A1* | 12/2009 | Fukutomi ............. G06F 11/108 714/6.2 |
| 2010/0169274 A1 | 7/2010 | Kulkarni et al. |
| 2010/0211992 A1 | 8/2010 | Cho et al. |
| 2010/0228800 A1 | 9/2010 | Aston et al. |
| 2010/0278446 A1 | 11/2010 | Ganesh et al. |
| 2010/0281004 A1 | 11/2010 | Kapoor et al. |
| 2011/0022779 A1 | 1/2011 | Lund et al. |
| 2011/0082963 A1 | 4/2011 | Jeddeloh |
| 2011/0099435 A1 | 4/2011 | Wu |
| 2012/0042146 A1 | 2/2012 | Gandhi |
| 2013/0041927 A1* | 2/2013 | Song ..................... G06F 3/0608 707/813 |
| 2013/0046949 A1 | 2/2013 | Colgrove et al. |
| 2013/0227237 A1* | 8/2013 | Tashiro ................. G06F 3/0608 711/170 |
| 2013/0275656 A1 | 10/2013 | Talagala et al. |
| 2014/0258650 A1 | 9/2014 | Vishniac et al. |
| 2014/0258651 A1 | 9/2014 | Vishniac et al. |

OTHER PUBLICATIONS

International Search Report and Written Opinion, International Application No. PCT/US2014/016857, dated Apr. 24, 2014 (10 pages).

International Search Report and Written Opinion, International Application No. PCT/US2014/016848, dated Apr. 24, 2014 (10 pages).

International Search Report and Written Opinion, International Application No. PCT/US2014/016858, dated Apr. 30, 2014 (5 pages).

U.S. Appl. No. 13/787,055, filed Mar. 6, 2013, Managing Operations on Stored Data Units.

U.S. Appl. No. 13/787,138, filed Mar. 6, 2013, Managing Operations on Stored Data Units.

* cited by examiner

MANAGING OPERATIONS ON STORED DATA UNITS

CROSS-REFERENCE TO RELATED APPLICATIONS

This application is related to U.S. patent application Ser. No. 13/787,055, filed on Mar. 6, 2013, and to U.S. patent application Ser. No. 13/787,138, filed on Mar. 6, 2013, the contents of each of these applications being incorporated herein by reference.

BACKGROUND

This description relates to managing operations on stored data units.

Data storage systems provide various operations for storing, retrieving, or deleting data units (e.g., data units representing individual records). Different systems may use different storage formats, and different techniques for performing the operations. For example, for some systems, deleting data units may involve removing pointers or index entries for locating the data units, or may involve overwriting the data units. Some systems provide features such as data compression or data encryption, which may affect the implementation of the operations, or even which operations are supported. For example, a storage format that includes multiple data units compressed into a single block of data may support deletion of groups of compressed blocks (e.g., old or expired blocks), but might not support deletion of individual data units within those blocks.

SUMMARY

In one aspect, in general, a system for managing storage of data units includes a data storage system configured to store multiple data blocks, at least some of the data blocks containing multiple data units, with at least a group of the data blocks being stored contiguously, thereby supporting a first read operation that retrieves data units from at least two adjacent data blocks in the group (e.g., the first read operation may be a type of function or program that the storage interface module 104, or another interface to the data storage system, is configured to execute). The system also includes an interface, including at least one processor, coupled to the data storage system, and configured to perform one or more operations with respect to data units, the operations including a delete operation that replaces a first data block containing a data unit to be deleted with a second data block that does not contain the deleted data unit, with the second data block having the same size as the first data block.

Aspects can include one or more of the following features.

The second data block is adjacent to a data block that was adjacent to the first data block within the data storage system.

The second data block is stored in the same storage space as the first data block.

The delete operation maintains data blocks other than the first data block in the same storage locations within the data storage system in which they were stored before the delete operation was performed.

The data storage system is configured to store, for at least some of the data blocks, corresponding historical information about prior removal of one or more data units from that data block, the removal affecting at least some addresses of data units in that data block.

The operations include a second read operation, different from the first read operation, that accesses at least a first data unit stored in a particular data block according to address information interpreted based on any stored historical information corresponding to the particular data block.

The delete operation stores information about the deleted data unit in historical information corresponding to the second data block.

At least some of the historical information is stored in the data storage system.

At least a portion of the historical information is interleaved between different data blocks.

At least a portion of historical information corresponding to a particular data block is stored in a predetermined portion of that particular data block.

At least some of the data blocks are compressed data blocks.

The second read operation decompresses a particular compressed data block to recover a set of decompressed data units and retrieves the data unit to be read at a particular offset from a reference location based at least in part on the historical information corresponding to that particular compressed data block The first read operation decompresses multiple compressed data blocks and reads multiple decompressed data units sequentially.

The delete operation expands a stored size of the second compressed data block to account for a difference in size between the second compressed data block and the first compressed data block.

The stored size of the second compressed data block is expanded by storing overhead information associated with the second compressed data block in addition to the historical information corresponding to the second compressed data block.

The delete operation stores a new error-detecting code associated with the second compressed data block to replace an error-detecting code associated with the first compressed data block.

The operations include an add operation that stores a data unit to be added in association with a set of recently added data units.

The processor is further configured to compress the set of recently added data units as a compressed data block stored in the storage medium.

The data storage system is configured to store overhead information identifying the data blocks in the group as conforming to a predetermined storage format.

The overhead information includes an identifier in a header of each data block in the group identifying the predetermined storage format.

The first read operation is compatible with the predetermined storage format.

In another aspect, in general, a system for managing storage of data units includes means for storing multiple data blocks, at least some of the data blocks containing multiple data units, with at least a group of the data blocks being stored contiguously, thereby supporting a first read operation that retrieves data units from at least two adjacent data blocks in the group. The system also includes means for performing one or more operations with respect to data units, the operations including a delete operation that replaces a first data block containing a data unit to be deleted with a second data block that does not contain the deleted data unit, with the second data block having the same size as the first data block.

In another aspect, in general, a method for managing storage of data units includes storing multiple data blocks in a data storage system, at least some of the data blocks containing multiple data units, with at least a group of the data blocks being stored contiguously, thereby supporting a first read operation that retrieves data units from at least two adjacent data blocks in the group. The method also includes performing, using at least one processor, one or more operations with respect to data units, the operations including a delete operation that replaces a first data block containing a data unit to be deleted with a second data block that does not contain the deleted data unit, with the second data block having the same size as the first data block.

In another aspect, in general, software is stored on a computer-readable medium, for managing storage of data units. The software includes instructions for causing a computing system to: store multiple data blocks in a data storage system, at least some of the data blocks containing multiple data units, with at least a group of the data blocks being stored contiguously, thereby supporting a first read operation that retrieves data units from at least two adjacent data blocks in the group; and perform one or more operations with respect to data units, the operations including a delete operation that replaces a first data block containing a data unit to be deleted with a second data block that does not contain the deleted data unit, with the second data block having the same size as the first data block.

In another aspect, in general, a system for managing storage of data units includes a data storage system configured to store multiple data blocks, at least some of the data blocks containing multiple data units, with at least a group of the data blocks being stored contiguously, thereby supporting a first read operation that retrieves data units from at least two adjacent data blocks in the group (e.g., the first read operation may be a type of function or program that the storage interface module 104, or another interface to the data storage system, is configured to execute). The system also includes an interface, including at least one processor, coupled to the data storage system, and configured to perform two or more operations with respect to data units. The operations include: a second read operation, different from the first read operation, that retrieves a data unit to be read based at least in part on an address of a data block containing the data unit to be read, and a delete operation that replaces a first data block containing a data unit to be deleted with a second data block that does not contain the deleted data unit.

Aspects can include one or more of the following features.

The data storage system is configured to store, for at least some of the data blocks, corresponding historical information about prior removal of one or more data units from that data block, the removal affecting at least some addresses of data units in that data block.

The second read operation accesses at least a first data unit stored in a particular data block according to address information interpreted based on any stored historical information corresponding to the particular data block.

The delete operation stores information about the deleted data unit in historical information corresponding to the new data block.

At least some of the historical information is stored in the data storage system.

At least a portion of the historical information is interleaved between different data blocks.

At least a portion of historical information corresponding to a particular data block is stored in a predetermined portion of that particular data block.

At least some of the data blocks are compressed data blocks.

The second read operation decompresses a particular compressed data block to recover a set of decompressed data units and retrieves the data unit to be read at a particular offset from a reference location based at least in part on the historical information corresponding to that particular compressed data block.

The first read operation decompresses multiple compressed data blocks and reads multiple decompressed data units sequentially.

The delete operation expands a stored size of the second compressed data block to account for a difference in size between the second compressed data block and the first compressed data block.

The stored size of the second compressed data block is expanded by storing overhead information associated with the second compressed data block in addition to the historical information corresponding to the second compressed data block.

The delete operation stores a new error-detecting code associated with the second compressed data block to replace an error-detecting code associated with the first compressed data block.

The operations include an add operation that stores a data unit to be added in association with a set of recently added data units.

The processor is further configured to compress the set of recently added data units as a compressed data block stored in the storage medium.

The second read operation locates the data block including the data unit to be read based on an index that indicates the data block as containing data units having particular identifiers, to recover a set of decompressed data units, and searches for the data unit to be read within the decompressed data units.

The data storage system is configured to store overhead information identifying the data blocks in the group as conforming to a predetermined storage format.

The overhead information includes an identifier in a header of each data block in the group identifying the predetermined storage format.

The first read operation is compatible with the predetermined storage format.

In another aspect, in general, a system for managing storage of data units includes means for storing multiple data blocks, at least some of the data blocks containing multiple data units, with at least a group of the data blocks being stored contiguously, thereby supporting a first read operation that retrieves data units from at least two adjacent data blocks in the group. The system also includes means for performing two or more operations with respect to data units. The operations include: a second read operation, different from the first read operation, that retrieves a data unit to be read based at least in part on an address of a data block containing the data unit to be read, and a delete operation that replaces a first data block containing a data unit to be deleted with a second data block that does not contain the deleted data unit.

In another aspect, in general, a method for managing storage of data units includes storing multiple data blocks in a data storage system, at least some of the data blocks containing multiple data units, with at least a group of the data blocks being stored contiguously, thereby supporting a first read operation that retrieves data units from at least two adjacent data blocks in the group. The method also includes performing, using at least one processor, two or more operations with respect to data units. The operations include: a second read operation, different from the first read operation, that retrieves a data unit to be read based at least in part on an address of a data block containing the data unit to be read, and a delete operation that replaces a first data block containing a data unit to be deleted with a second data block that does not contain the deleted data unit.

In another aspect, in general, software is stored on a computer-readable medium, for managing storage of data units. The software includes instructions for causing a computing system to: store multiple data blocks in a data storage system, at least some of the data blocks containing multiple data units, with at least a group of the data blocks being stored contiguously, thereby supporting a first read operation that retrieves data units from at least two adjacent data blocks in the group; and perform two or more operations with respect to data units. The operations include: a second read operation, different from the first read operation, that retrieves a data unit to be read based at least in part on an address of a data block containing the data unit to be read, and a delete operation that replaces a first data block containing a data unit to be deleted with a second data block that does not contain the deleted data unit.

In another aspect, in general, a system for managing storage of data units includes a data storage system configured to store multiple data blocks, at least some of the data blocks containing multiple data units, and configured to store, for at least some of the data blocks, corresponding historical information about prior removal of one or more data units from that data block, the removal affecting at least some addresses of data units in that data block. The system also includes an interface, including at least one processor, coupled to the data storage system, and configured to perform at least one operation that accesses at least a first data unit stored in a first data block according to address information interpreted based on any stored historical information corresponding to the first data block.

Aspects can include one or more of the following features.

The historical information corresponding to the first data block includes information about prior removal of one or more data units from the first data block affecting relative offsets of data units that have been decompressed from the first data block.

At least some of the data blocks are compressed data blocks.

The interface is configured to perform two or more operations with respect to data units, the operations including: a read operation that retrieves a data unit to be read based at least in part on address information that locates the data unit relative to a reference address, and a delete operation that removes a data unit to be deleted, and stores historical information about the deleted data unit for interpreting address information for other data units to take into account any shifts relative to the reference address due to removal of the data unit to be deleted.

The interface is configured to perform two or more operations with respect to data units, the operations including: a first read operation that retrieves a data unit to be read based at least in part on historical information corresponding to a compressed data block, and a delete operation that replaces a first compressed data block containing a data unit to be deleted with a second compressed data block that does not contain the deleted data unit, and stores information about the deleted data unit in historical information corresponding to the second compressed data block.

The first read operation decompresses a particular compressed data block to recover a set of decompressed data units and retrieves the data unit to be read at a particular offset from a reference location based at least in part on the historical information corresponding to that particular compressed data block.

The first read operation determines whether or not the historical information includes information about one or more previously deleted data units.

If the historical information includes information about one or more previously deleted data units, the first read operation determines whether or not to adjust the particular offset based on comparing the particular offset to a value in the historical information that indicates an offset of at least one of the previously deleted data units.

If the particular offset is to be adjusted, the first read operation adjusts the particular offset based on offsets and sizes of one or more previously deleted data units.

The delete operation expands a stored size of the second compressed data block to account for a difference in size between the second compressed data block and the first compressed data block.

The stored size of the second compressed data block is expanded by storing overhead information associated with the second compressed data block in addition to the historical information corresponding to the second compressed data block.

The delete operation stores a new error-detecting code associated with the second compressed data block to replace an error-detecting code associated with the first compressed data block.

The operations include an add operation that stores a data unit to be added in association with a set of recently added data units.

The processor is further configured to compress the set of recently added data units as a compressed data block stored in the storage medium.

The operations include a second read operation, different from the first read operation, that decompresses one or more compressed data blocks and reads multiple decompressed data units sequentially.

The operations include a third read operation, different from the first and second read operations, that decompresses a particular compressed data block indicated by an index as including a data unit having a particular identifier, to recover a set of decompressed data units, and searches for the data unit having the particular identifier within the decompressed data units.

At least some of the historical information is stored in the data storage system.

At least a portion of the historical information is interleaved between different data blocks.

At least a portion of historical information corresponding to a particular data block is stored in a predetermined portion of that particular data block.

In another aspect, in general, a system for managing storage of data units includes means for storing multiple data blocks, at least some of the data blocks containing multiple data units, and configured to store, for at least some of the data blocks, corresponding historical information about prior removal of one or more data units from that data block, the removal affecting at least some addresses of data units in that data block. The system also includes means for performing at least one operation that accesses at least a first data unit stored in a first data block according to address information interpreted based on any stored historical information corresponding to the first data block.

In another aspect, in general, a method for managing storage of data units includes storing multiple data blocks in a data storage system, at least some of the data blocks containing multiple data units, and configured to store, for at least some of the data blocks, corresponding historical information about prior removal of one or more data units from that data block, the removal affecting at least some addresses of data units in that data block. The method also includes performing, using at least one processor, at least one operation that accesses at least a first data unit stored in a first data block according to address information interpreted based on any stored historical information corresponding to the first data block.

In another aspect, in general, software is stored on a computer-readable medium, for managing storage of data units. The software includes instructions for causing a computing system to: store multiple data blocks in a data storage system, at least some of the data blocks containing multiple data units, and configured to store, for at least some of the data blocks, corresponding historical information about prior removal of one or more data units from that data block, the removal affecting at least some addresses of data units in that data block; and perform at least one operation that accesses at least a first data unit stored in a first data block according to address information interpreted based on any stored historical information corresponding to the first data block.

Aspects can include one or more of the following advantages.

A delete operation is provided that completely removes a data unit from a compressed data store, which may be useful, for example, for complying with privacy laws that require data to be removed in response to a customer request. Pointers that locate a data unit at a particular address or relative offset from a reference address may be affected by the removal of the deleted data unit. However, those pointers do not need to be changed or even located at the time the delete operation is performed. Instead, the pointers can be corrected later, if necessary, if those data units are ever actually accessed. For many uses of the data store, such an on-demand pointer correction is more efficient than locating and correcting the pointers at the time of deletion. The removal of deleted data units from the compressed blocks of a multi-block compressed data store is also performed in a manner that preserves compatibility of the delete operation with operations that read data units by scanning multiple data units recovered from one or more compressed data blocks. For example, the delete operation may be compatible with a scanning read operation that applies a standard decompression function (e.g., gzcat) to a file stored in a known compression format (e.g., gzip), and interprets the decompressed data (e.g., according to a record format) to sequentially recover individual records as the data units, without relying on an index or other address information. By ensuring the file does not have any gaps between compressed data block after the delete operation, the scanning read operation is still able to correctly parse the compression format, without the entire file having to be moved or rewritten. Additionally, using the historical information, the delete operation can be implemented such that read operations that do rely on address information continue to function properly regardless of whether or not any data units have previously been deleted from a compressed data store.

Other features and advantages of the invention will become apparent from the following description, and from the claims.

DESCRIPTION

Figure 1:
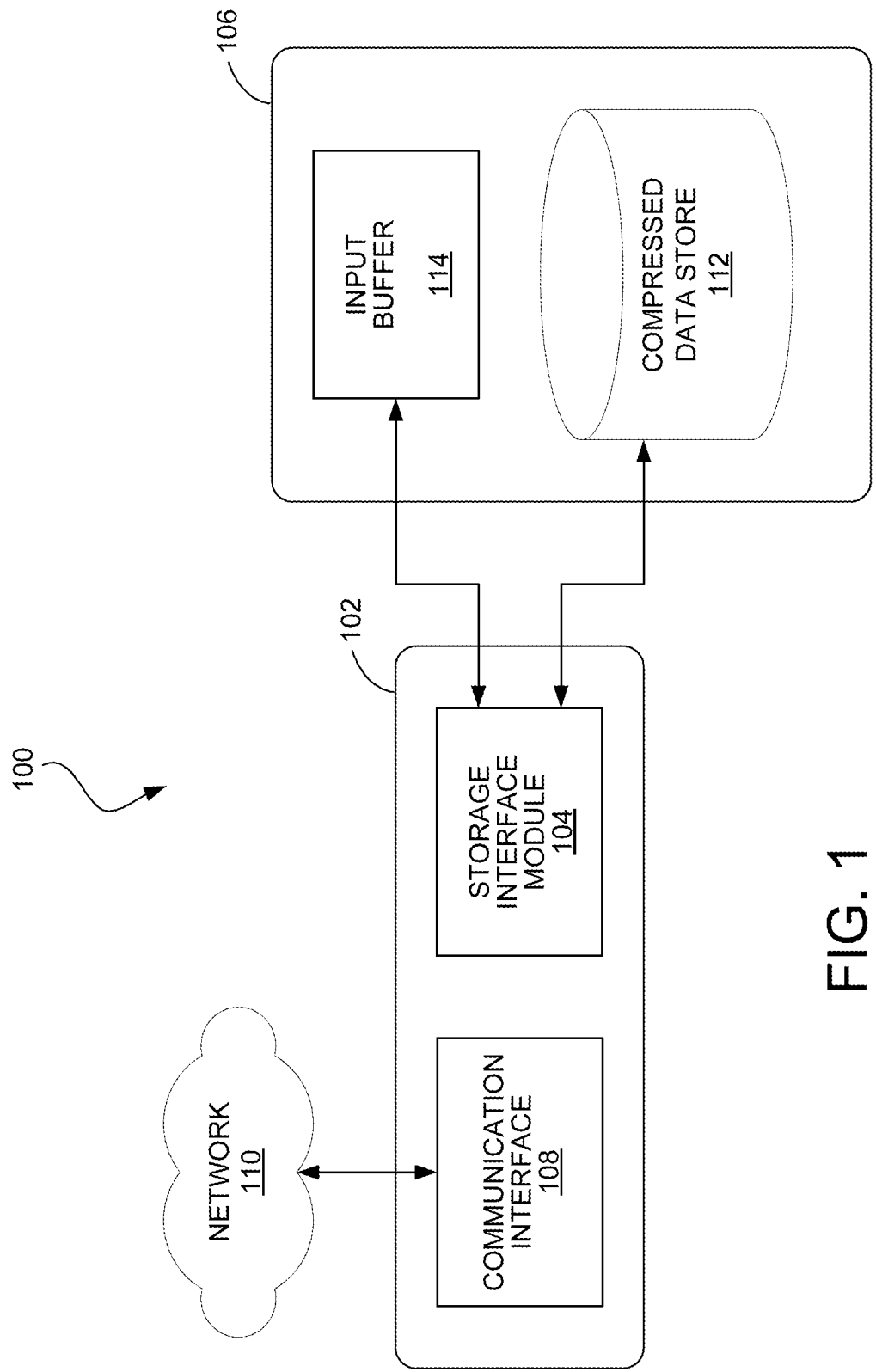
FIG. 1 is a block diagram of a data storage system.

FIG. 1 shows an example of a data processing system 100 in which the data storage techniques can be used. An execution environment 102 includes a storage interface module 104 configured to perform data operations with respect to data units stored in a data storage system 106. The execution environment 102 may be hosted, for example, on one or more general-purpose computers under the control of a suitable operating system, such as a version of the UNIX operating system. For example, the execution environment 102 also can include a multiple-node parallel computing environment including a configuration of computer systems using multiple central processing units (CPUs) or processor cores, either local (e.g., multiprocessor systems such as symmetric multi-processing (SMP) computers), or locally distributed (e.g., multiple processors coupled as clusters or massively parallel processing (MPP) systems, or remote, or remotely distributed (e.g., multiple processors coupled via a local area network (LAN) and/or wide-area network (WAN)), or any combination thereof. The data storage system 106 includes one or more storage devices, which may be local to the execution environment 102, for example, being connected to a computer hosting the execution environment 102, or may be remote to the execution environment 102, for example, being in communication with a computer hosting the execution environment 102 over a remote connection. The one or more storage devices may include, for example, volatile memory such as random access memory (RAM) and non-volatile memory such as magnetic or solid-state drives. The data processing system 100 may be used to receive data from or provide data to other systems over a communication interface 108 coupled to a network 110.

The individually accessible data units received from various sources for storage in the data storage system 106 may be organized as records having values for respective fields (also called "attributes" or "columns"), including possibly null values. For example, a credit card company may receive data representing individual transactions from various retail companies. Each transaction is associated with values representing attributes such as a customer name, a date, a purchase amount, etc. The storage interface module 104 may ensure that the data is formatted according to a predetermined record format so that the values associated with a transaction are stored in a record. In some cases this may include transforming the data from the sources according to the record format. In other cases, one or more sources may provide the data already formatted according to the record format. In some circumstances, the record format may not be known initially and may instead be determined after analysis of the source or the data.

The storage interface module 104 provides a set of data operations for managing data stored in the data storage system 106. For example, a processor is configured to execute stored instructions for a particular data operation in response to requests to perform that particular data operation. The data operations include an add operation for adding new data units, a delete operation for deleting stored data units, and multiple read operations for retrieving stored data units in different reading modes, as described in more detail below, and returning the retrieved data units that have been requested to be read. The data operations may be initiated in response to another portion of the data processing system 100, including a user interface that receives input from a user.

In some implementations, the data storage system 106 includes a compressed data store 112 that stores data in a storage format in which compressed data blocks are each formed by compressing multiple data units. In some implementations, the data storage system 106 stores sets of data units that are not necessarily compressed, but are associated with each other, such as being stored at offsets specified relative to a common reference location. The storage interface module 104 can, in some implementations, process the data units to generate data blocks using any of a variety of techniques to combine the records in some way (i.e., so that the block is not merely a concatenated set of records). A data block that contains multiple data units can then be processed using a complementary function (e.g., decompression) to recover the individual data units. A data unit that is contained within a data block may not be stored in its original form (e.g., it may be represented by different bits), and it may not be represented individually with one-to-one correspondence between each data unit and stored bits in the data block (e.g., any particular bit within a compressed data block may be a function of multiple data units). If compression is used, the compression can be part of performing a desired function. For example, in some implementations, the module 104 processes a set of records to generate a block of encrypted data. The compression ratio (i.e., compressed size divided by uncompressed size) of different data blocks will typically vary, and in some cases, the compression ratio of some data blocks may be larger than one.

One example of such a storage format is a compressed record file with an optional index for locating individual stored data units, as described in detail in U.S. Pat. No. 7,885,932, incorporated herein by reference. For example, to generate a compressed record file, the storage interface module 104 sorts received records by a primary key value that identifies each record (e.g., either a unique key identifying a single record, or a key that identifies multiple updated versions of a record), and groups the records into sets of records that correspond to non-overlapping ranges of primary key values. Each set of records may correspond to a predetermined number of records (e.g., 100 records). The module 104 compresses each set of records into a compressed block of data. These compressed blocks are collected together to form a compressed record file (e.g., by appending successive blocks to the file), which is stored in the compressed data store 112 (e.g., hosted on a non-volatile storage medium such as one or more hard disk drives). Any number of compressed record files can also be combined to form a compound compressed record file. In some implementations, the storage interface module 104 manages an index that includes an entry for each of the blocks. The index may be used to locate a block that may include a given record by listing a range of primary keys of records that may be included in that block, as described in more detail in U.S. Pat. No. 7,885,932. While the index can be stored in the same storage medium as the compressed record file, the index may preferably be stored in a relatively faster memory (e.g., a volatile storage medium such as a Dynamic Random Access Memory) since the index is typically much smaller than the compressed record file.

As new data units are received for storage in the data storage system 106 (by an add operation), the data units may initially be stored in uncompressed form in an input buffer 114. After a predetermined threshold, for example, after a certain number of data units have been stored in the input buffer 114, or after the input buffer 114 reaches a certain size, or after a certain interval of time, multiple data units are collectively compressed into a single compressed data block, using any of a variety of compression formats (e.g., the gzip format). The compressed data block may then be appended to one of the compressed record files in the compressed data store 112.

In some implementations, there are different read operations for different reading modes, to provide flexibility in the way that data can be retrieved. For each of the reading modes, one or more compressed data blocks, identified by the read operation, are decompressed, yielding a set of data units. But, the different reading modes use different techniques to retrieve one or more of the data units to be returned in response to the read operation, from the set of data units that have been recovered from a data block. For example, in a first reading mode (called "direct addressing mode"), specific data unit(s) are retrieved based on address information that specifies: the data block containing a data unit, an offset (relative to the beginning of the recovered set) of a start of the data unit, and a length of the data unit. In some cases, the offset may need to be updated based on historical information, as described in more detail below. The specification of the length of the data unit supports data units with variable lengths and/or unspecified lengths. Alternatively, in some implementations, if all data units have the same specified fixed length, then the length does not need to be included in the direct address. In some implementations, a direct address can implicitly specify a relative offset of a data unit based on auxiliary information. For example, a direct address can specify: the data block containing a data unit, and a record identifier that is mapped to an offset of a start of the data unit (e.g., based on a mapping stored in association with the data block).

In a second reading mode (called "scanning mode") data units are read sequentially as a continuous stream from the recovered set. For a compressed record file that includes multiple compressed data blocks, when the end of one compressed data block is reached, data units from the next compressed data block are decompressed and read, until the end of the file is reached. In scanning mode, all of the read data units can be returned in response to the read operation, or any subset of the read data units can be returned (e.g., based on a selected filter). In some implementations of the system 100, a scanning mode read operation is configured to be performed by an interface to the data storage system 106 that is separate from the storage interface module 104 (e.g., by a third-party program running in the execution environment 102 or by a system with access to the data storage system 106 from outside the execution environment 102).

In a third reading mode (called "key lookup mode"), record(s) with specific key(s) are retrieved by accessing an index identifying the range of possible keys corresponding to each data block. A key specified by the read operation may be a primary key, or a secondary key that is mapped to one or more primary keys of data units to be retrieved. A data block listed by the index as corresponding to a range that includes a specified primary key is decompressed, and the recovered set of data units are searched for that primary key. Other read operations could also be supported. For example, a read operation could specify a primary or secondary key and that key could be mapped to address information for a particular data unit using a primary key-to-direct address lookup table.

The delete operation enables a specified data unit to be removed from the compressed data block in the compressed data store 112 that contains that data unit, without requiring any other portions of the compressed data store 112 to be modified. For example, some implementations do not require more than a single data block of a compressed record file to be modified, and do not require any index for the data block or the file to be modified. This is useful, for example, if a particular data unit contains information that needs to be purged (e.g., customer information required by privacy laws to be removed in response to a customer request), but the other data units in the same block or the same compressed record file still need to be maintained. The delete operation replaces the compressed data block containing the data unit to be deleted with a new compressed data block that does not contain the deleted data unit, and stores information about the deleted data unit in historical information associated with the new compressed data block. The historical information can be stored in the compressed data store 112 along with the compressed data blocks (e.g., in a predetermined portion of the compressed data block such as a header or footer, or other overhead information or available space interleaved between different compressed data blocks). The historical information can include a list of the offsets of deleted data units and their lengths, for example.

Using this historical information, other data units that remain in the new compressed data block can still be accessed later using existing address information interpreted according to the historical information to take into account any shifts due to any deleted data units. In particular, all existing direct address offsets for data units located in a set recovered from a data block after a deleted data unit do not need to be updated at the time of a delete operation, which may aid efficiency. For cases in which a relatively small number of the stored data units are expected to be read using a read operation in direct addressing mode, writing historical information for adjusting offsets on-demand may be more efficient than updating a potentially large number of stored direct address offsets (e.g., stored in indexes) for data units that may never be read. Furthermore, in some implementations, the storage interface module 104 may not have access to all of the locations in which direct address offsets may be stored, and therefore would not be able to update all of the offsets.

Figure 2:
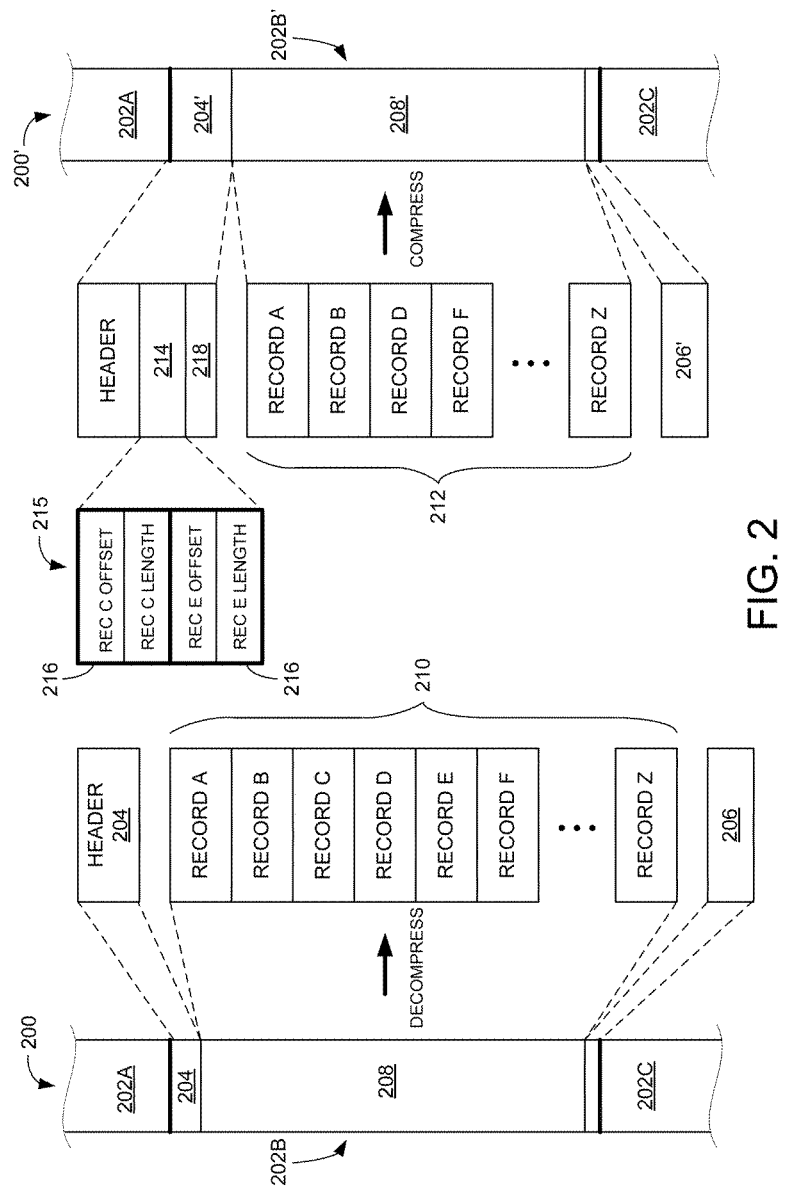
FIG. 2 is a schematic diagram of a data storage format.

Referring to FIG. 2, an example of a data storage format for the compressed data store 112 includes a compressed record file 200 that includes a number of compressed data blocks including data blocks 202A-202C. In this example, the data block 202B includes a header 204 and a footer 206. The header 204 includes fields that store information about the compression and decompression of the data block 202B and other relevant information. The footer 206 includes an error-detecting code, such as a cyclic redundancy check (CRC) or other checksum, for detecting and/or correcting errors in the compression and decompression processes. A section of compressed data 208 within the data block 202B can be decompressed to recover a set 210 of records that were stored in the compressed record file 200. For some compression formats, the header 204 has a variable length and therefore includes information indicating where the header 204 ends and where the compressed data 208 begins.

For example, in the gzip compression format, the header 204 has the fields listed in the following table, including six mandatory fields in the first 10 bytes, and up to six optional fields that include variable length fields.

TABLE 1

| Length (bytes) | GZIP Header Field Contents |
|---|---|
| 2 | A "magic header" that uniquely identifies the type of the file (gzip: 0x1f, 0x8b) |
| 1 | Compression method (e.g., Deflate based on Lempel-Ziv 1977 (LZ77), or Lempel-Ziv and Haruyasu (LZH), among others, or no compression) |
| 1 | 8 1-bit flags that indicate properties of the file including the presence or absence of the optional fields |
| 4 | File modification time |
| 1 | Extra flags available for use by specific compression methods |
| 1 | Operating System (OS) type of the file (e.g., FAT or Unix, among others) |
| 2 | (optional) part number, if the file is one of multiple parts |
| 2 | (optional) length of the Extra Field (XLEN bytes) |
| XLEN | (optional) Extra Field (can hold any binary data - up to 65,535 bytes) |
| variable | (optional) original file name (terminated by a null byte: 0x00) |
| variable | (optional) comment (terminated by a null byte: 0x00) |
| 12 | (optional) encryption header, if the file is encrypted |

The gzip compression format also has an 8-byte footer that includes a 4-byte CRC code and a 4-byte value that provides the uncompressed size of the original data that was compressed modulo $2^{32}$. Two or more compressed data blocks that each have their own gzip header and footer, and are stored adjacent to each other (i.e., with the next header starting immediately after the previous footer), are recognizable as a single valid gzip file.

When the storage interface module 104 performs a delete operation in which one or more records to be deleted (e.g., Record C and Record E) are indicated as being contained in the data block 202B (e.g., by an index), the module 104 decompresses the compressed data 208 to recover the set 210 of records, generates a new set 212 of records that omits the records being deleted, and compresses the new set 212 of records into modified compressed data 208'. Since the new set 212 of records contains less information content than the original set of records 210, the modified compressed data 208' will have a smaller size than the original compressed data 208 (assuming certain minimum information content in any given record that may be deleted). The section of the data block 202B that stored the compressed data 208 is then replaced with the modified compressed data 208' and the original header 204 and footer 206 are replaced with a modified header 204' and footer 206', which together correspond to a modified data block 202B'. Since the modified data 208' occupies less storage space than the original data 208, there is storage space available for the modified header 204' to occupy more storage space than the original header 204. This extra storage space is used to store historical information 214 in an available variable-length field (e.g., the Extra Field of the gzip compression format).

For most record formats, the storage space needed to accommodate the historical information 214 within the modified header 204' is likely to be smaller than the expected size reduction of the modified data 208' after even a single record has been deleted. In the unlikely event that the size is not reduced enough to fully accommodate the historical information 214, the associated delete operation can be canceled and an error message returned. To ensure that the modified data block 202B' has the same total size as the original data block 202B, the header can also be lengthened as needed by writing padding 218, such as a repeated byte pattern (e.g., any number of bytes containing 0xff) or other overhead information, in the same or another variable-length field (e.g., the comment field of the gzip compression format). Optionally, for implementations in which the deletion of a record may not provide sufficient space for the historical information (e.g., for an especially compact record structure), padding can also be included in the header when a compressed data block is first generated. This initial padding can then be reduced as needed to provide additional space in the header for the historical information.

As described above, the historical information 214 summarizes the records that have been removed from the set 210 of records with sufficient information for the direct address offsets of the remaining records in the new smaller set 212 to be corrected if necessary, relative to a common reference storage location (e.g., a starting address in an address space sequentially storing the records in the new set 212 of recovered records). An example of a data structure 215 that can be used to encode the historical information 214 is a list of elements 216 that each include an offset of a deleted record relative to the start of the first record in the original set of records (whether that first record is currently present or not), and a corresponding length of that record. In the example illustrated in FIG. 2, there are two elements 216 for each of the deleted records Record C and Record E. The encoding of the record length supports records with variable lengths and/or unspecified lengths. Alternatively, in other examples, if all records have the same specified fixed length, then the length does not need to be stored in the element 216. The elements 216 occur in the list sorted in the order of their offset values. As additional delete operations are performed to remove additional records, additional elements 216 are appended to or inserted into the list.

Various encoding techniques can be used to store this data structure 215 in an efficient manner. For example, any sequence of two or more adjacent deleted records can be collapsed into a single element 216 that includes the offset of the first record in the sequence and a length equal to the sum of the lengths of the records in the sequence. So each element 216 may represent a previously deleted region that stored any number of records that were previously deleted. In some cases, the adjacent deleted records may have been deleted in different delete operations. Each element 216 can be stored in adjacent slots of bits in a variable-length field of the header 204', using a predetermined number of bits to store the offset and a predetermined number of bits to store the length. The amount of storage space used to store the values of the offsets can be limited to a relatively small number of bits sufficient to store the largest possible offset that is expected to be possible. The amount of storage space used to store the values of the lengths can also be limited (e.g., to the same number of bits used to store the offsets, to allow for collapsed elements). The values of the offsets and lengths can also be compressed based on assumptions about what values are possible. For example, if it is known that a record will always occupy an even number of bits, the values of the offsets and lengths can be interpreted as encoding a particular number of bit pairs. So, 8 bits could encode values up to 255×2=510 bits. Similarly, if it is known that a record will always occupy a storage space that is a multiple of some number of bits, the values of the offsets and lengths can be interpreted as encoding a number times that multiple, as opposed to the actual number of bits. This data structure 215 can optionally also be further compressed (e.g., using run-length encoding).

Figure 3A:
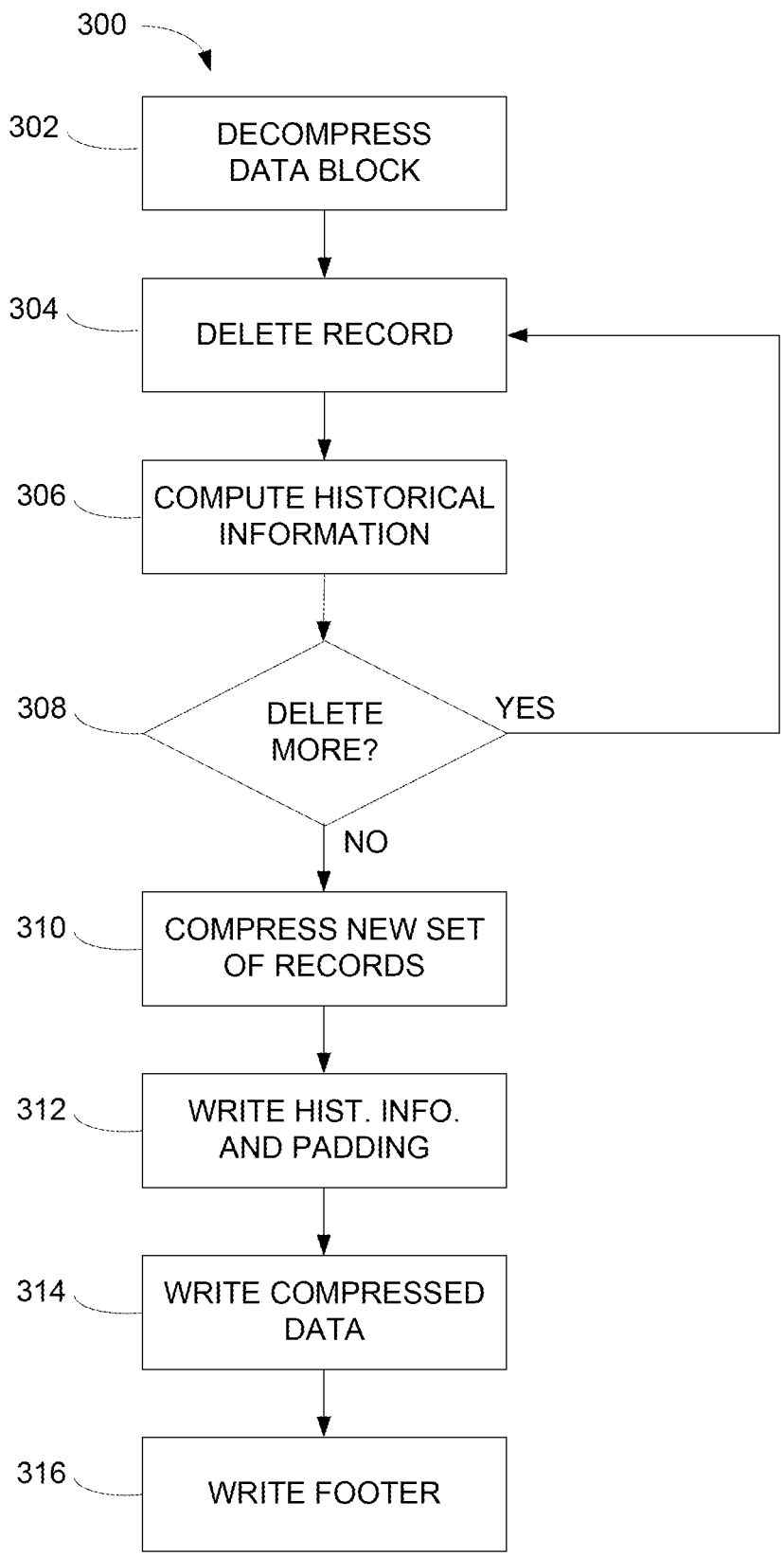
FIGS. 3A-3D are flowcharts of data operations.

FIG. 3A shows a flowchart 300 for an example of a delete operation performed to delete one or more records, each with a direct address corresponding to the triplet (BLOCK, OFFSET, LENGTH). (In this example, one or more records in a single block are being deleted, but in other examples records from any number of blocks may be deleted in a delete operation.) The storage interface module 104 decompresses (302) the data block in the compressed data store 112 with identifier BLOCK into an address space that starts at the address START. The module 104 deletes (304) the record at the address START+OFFSET (with a length of LENGTH). The module 104 computes (306) historical information that encodes the values OFFSET and LENGTH. The module 104 determines (308) whether there are more records to delete from this block, and if so repeats the delete (304) and compute (306) steps. After the records have been deleted, the module 104 writes a new set of records into a portion of the memory space in which the remaining records are adjacent, without any gaps where omitted record(s) used to be (e.g., into a temporary file), and compresses (310) the new set of records. The module 104 writes (312) the computed historical information data structure and any necessary padding into the header of the block BLOCK. The module 104 writes (314) the resulting compressed data into the block BLOCK in the compressed data store 112 such that it ends at the same location as the original compressed data in the block BLOCK. The module 104 writes (316) a new footer (replacing the previous footer) with the error-detecting code for the new compressed data.

In addition to such an "expunging" delete operation that actually removes the information in the record being deleted, the storage interface module 104 can also be configured to provide other delete operations that simply hide or flag a record that is to be deleted without actually removing the information in the record. These delete operations may not require writing historical information, or even decompression of a block, which may be useful for providing a faster but less secure form of deletion. However, the fully expunging delete operation may also be available, for example, to satisfy stricter requirements for purging the information such that it cannot be recovered, as required by some privacy laws.

Figure 3B:
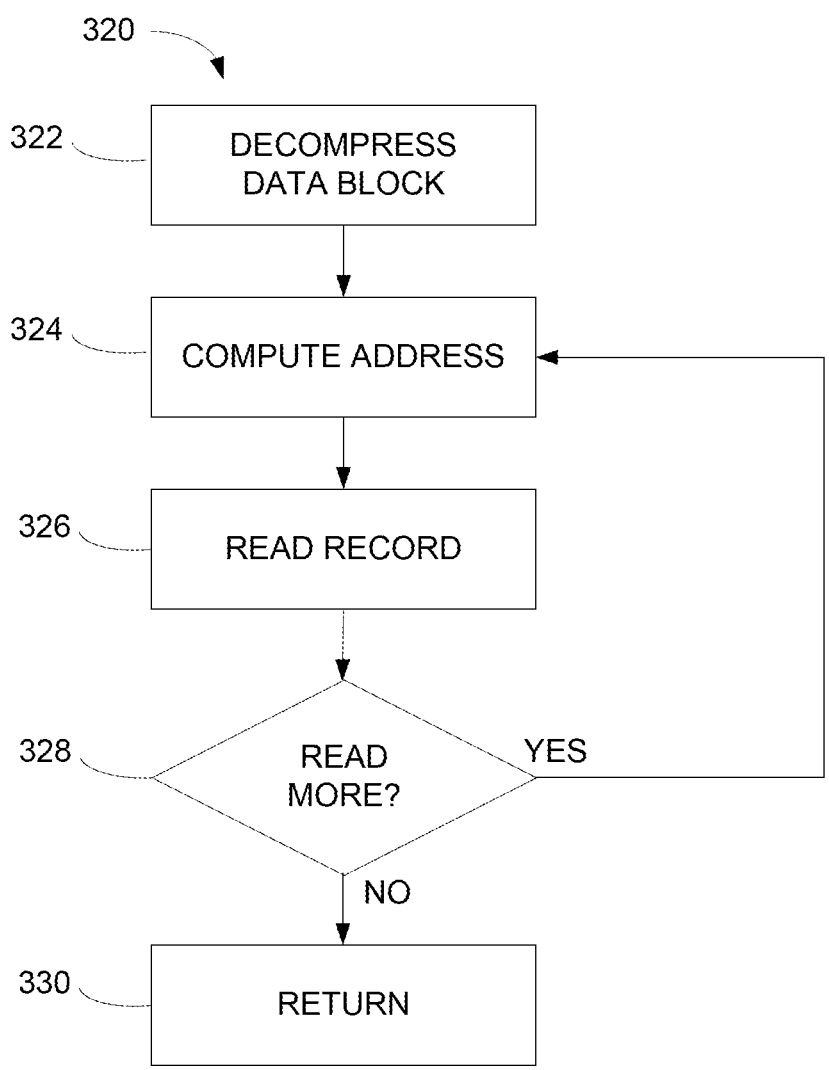

FIG. 3B shows a flowchart 320 for an example of a first (direct addressing) read operation performed to read one or more records, each with a direct address corresponding to the triplet (BLOCK, OFFSET, LENGTH). (In this example, one or more records in a single block are being read, but in other examples records from any number of blocks may be read in a read operation.) The storage interface module 104 decompresses (322) the data block in the compressed data store 112 with identifier BLOCK into an address space that starts at the address START. The module 104 computes (324) the address of the record to be read as START+OFFSET−CORRECTION, where CORRECTION is computed based on any existing historical information for the block BLOCK. For example, the module 104 determines how many previously deleted regions have offset values less than OFFSET and end before OFFSET. If there are none, then no correction is needed and CORRECTION=0. Otherwise, CORRECTION is equal to the sum of the lengths of each previously deleted region that does have an offset value less than OFFSET. So, the correction to account for previously deleted regions depends on how many previously deleted records originally existed between a particular record to be read and the start of the set of records. After computing the address, the module 104 reads (326) the record at the computed address. If a previously deleted region has an offset value less than or equal to OFFSET but does not end before OFFSET, then the computed address falls into that previously deleted region, and the module 104 skips the read step 326 and instead reports that the record to be read has already been deleted. The module 104 determines (328) whether there are additional records to be read, and if so repeats the compute (324) and read (326) steps. When there are no additional records to be read in the block, the operation returns (330).

Other implementations of the first (direct addressing) read operation are also possible. For example, instead of computing a corrected address for each record to be read, the records recovered after decompressing the compressed data block can be written into the address space with the appropriate gaps where the deleted records used to be. The information necessary to determine where those gaps should be can be derived from the same historical information described above. The read operation could then proceed to read each record at its uncorrected address START+OFFSET.

Figure 3C:
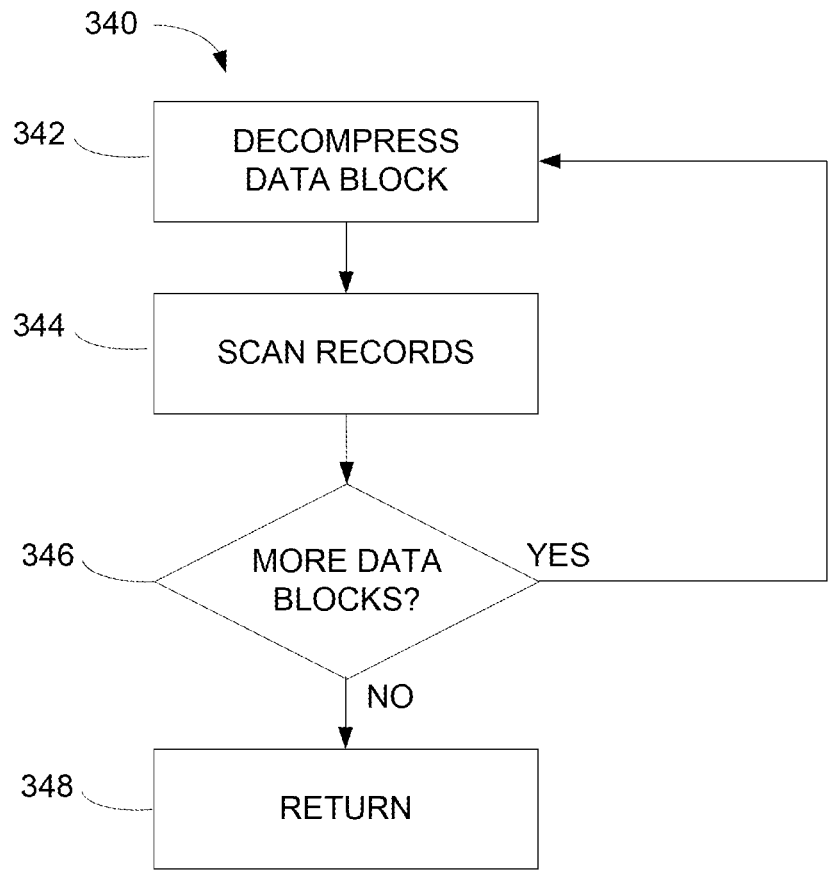

FIG. 3C shows a flowchart 340 for an example of a second (scanning) read operation that scans over one or more blocks within a compressed record file from which records are to be read. The storage interface module 104 decompresses (342) the first data block in the compressed data store 112 into an address space. The module 104 scans (344) the address space to read each individual record (e.g., by recognizing the start of each record and/or the end of each record). The module 104 determines (346) whether there is another data block within the file (e.g., by detecting another gzip magic header), and if so decompresses (342) the next data block to read additional records. When there are no additional data blocks to be read in the file (e.g., by detecting the end of the file), the operation returns (348).

While it is possible to implement the expunging delete operation in a way that fully expunges a record without having to store historical information (e.g., by overwriting the deleted records in-place with the gaps filled with a predetermined pattern such as all 1 or 0 bits), such a delete operation would require the scanning mode read operation to recognize and ignore these deleted records. By removing the gaps where the deleted records used to be, and preserving that information instead within the historical information, the scanning mode read operation can be implemented in a flexible manner that is compatible with any of a variety of techniques that may be used to read the information in the compressed data store 112, including by modules other than the storage interface module 104 (e.g., using third-party software). Additionally, by filling the extra space that remains after the smaller modified compressed data 208' replaces the larger original compressed data 208 (e.g., by filling a field of the modified header 204'), there are no unexpected gaps in the compressed record file, enabling the second (scanning) read operation to successfully recognize each compressed data block. For example, in implementations that use the gzip format, after a footer, the module 104 expects either another start of a compressed data block (i.e., another gzip magic header) or an indicator of the end of the compressed record file. Expanding the size of the compressed data block being modified by a delete operation in this way enables this scanning mode compatibility to be maintained without having to shift the storage locations of any of the compressed data blocks in the compressed record file that occur after the compressed data block being modified.

Figure 3D:
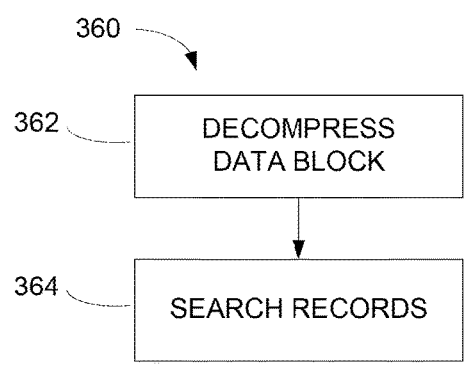

FIG. 3D shows a flowchart 360 for an example of a third (key lookup) read operation performed to read one or more records, each with an identifying key value. The storage interface module 104 decompresses (362) the data block in the compressed data store 112 with identifier BLOCK into an address space. The module 104 searches (364) the records in the address space to locate any records with a provided key value.

To enable multiple concurrent data operations to be performed, by the storage interface module 104, or by other modules or systems accessing the compressed data store 112, techniques can be used to avoid collisions between two data operations. If delete operations are expected to be relatively infrequent, the error-detecting code in the footer of a compressed data block can be used by a data operation after decompressing to detect a data block that is in the process of having its compressed data updated during a delete operation. For example, after an invalid checksum, the data operation can either output an error message or try again after a delay to allow the delete operation to complete. If delete operations are expected to be relatively frequent, locking mechanisms can be used to prevent such collisions.

The data storage techniques described above can be implemented using a computing system executing suitable software. For example, the software may include procedures in one or more computer programs that execute on one or more programmed or programmable computing system (which may be of various architectures such as distributed, client/server, or grid) each including at least one processor, at least one data storage system (including volatile and/or non-volatile memory and/or storage elements), at least one user interface (for receiving input using at least one input device or port, and for providing output using at least one output device or port). The software may include one or more modules of a larger program, for example, that provides services related to the design, configuration, and execution of dataflow graphs. The modules of the program (e.g., elements of a dataflow graph) can be implemented as data structures or other organized data conforming to a data model stored in a data repository.

The software may be provided on a tangible, non-transitory medium, such as a CD-ROM or other computer-readable medium (e.g., readable by a general or special purpose computing system or device), or delivered (e.g., encoded in a propagated signal) over a communication medium of a network to a tangible, non-transitory medium of a computing system where it is executed. Some or all of the processing may be performed on a special purpose computer, or using special-purpose hardware, such as coprocessors or field-programmable gate arrays (FPGAs) or dedicated, application-specific integrated circuits (ASICs). The processing may be implemented in a distributed manner in which different parts of the computation specified by the software are performed by different computing elements. Each such computer program is preferably stored on or downloaded to a computer-readable storage medium (e.g., solid state memory or media, or magnetic or optical media) of a storage device accessible by a general or special purpose programmable computer, for configuring and operating the computer when the storage device medium is read by the computer to perform the processing described herein. The inventive system may also be considered to be implemented as a tangible, non-transitory medium, configured with a computer program, where the medium so configured causes a computer to operate in a specific and predefined manner to perform one or more of the processing steps described herein.

A number of embodiments of the invention have been described. Nevertheless, it is to be understood that the foregoing description is intended to illustrate and not to limit the scope of the invention, which is defined by the scope of the following claims. Accordingly, other embodiments are also within the scope of the following claims. For example, various modifications may be made without departing from the scope of the invention. Additionally, some of the steps described above may be order independent, and thus can be performed in an order different from that described.

What is claimed is:

1. A system for managing storage of data units, the system including:
   a data storage system configured to store multiple data blocks, at least some of the data blocks containing multiple data units, with at least a group of the data blocks being stored contiguously, thereby supporting a first read operation that retrieves data units from at least two adjacent data blocks in the group; and
   an interface, including at least one processor, coupled to the data storage system, and configured to perform one or more operations with respect to data units, the operations including a delete operation that replaces a first data block containing a data unit to be deleted with a second data block that does not contain the deleted data unit, and stores information about the deleted data unit and overhead information, both the information about the deleted data unit and the overhead information being stored within the second data block, and the size of the overhead information being dependent on the size of the information about the deleted data unit so that the second data block has the same size as the first data block after the information about the deleted data unit and the overhead information are stored within the second data block.

2. The system of claim 1, wherein the second data block is adjacent to a data block that was adjacent to the first data block within the data storage system.

3. The system of claim 1, wherein the second data block is stored in the same storage space as the first data block.

4. The system of claim 1, wherein the delete operation maintains data blocks other than the first data block in the same storage locations within the data storage system in which they were stored before the delete operation was performed.

5. The system of claim 1, wherein the data storage system is configured to store, for at least some of the data blocks, corresponding historical information about prior removal of one or more data units from that data block, the removal affecting at least some addresses of data units in that data block.

6. The system of claim 5, wherein the operations include a second read operation, different from the first read operation, that accesses at least a first data unit stored in a particular data block according to address information interpreted based on any stored historical information corresponding to the particular data block.

7. The system of claim 5, wherein the delete operation stores the information about the deleted data unit in historical information corresponding to the second data block.

8. The system of claim 5, wherein at least some of the historical information is stored in the data storage system.

9. The system of claim 8, wherein at least a portion of the historical information is interleaved between different data blocks.

10. The system of claim 8, wherein at least a portion of historical information corresponding to a particular data block is stored in a predetermined portion of that particular data block.

11. The system of claim 1, wherein at least some of the data blocks are compressed data blocks.

12. The system of claim 11, wherein the second read operation decompresses a particular compressed data block to recover a set of decompressed data units and retrieves the data unit to be read at a particular offset from a reference location based at least in part on the historical information corresponding to that particular compressed data block.

13. The system of claim 11, wherein the first read operation decompresses multiple compressed data blocks and reads multiple decompressed data units sequentially.

14. The system of claim 11, wherein the first and second data blocks are compressed data blocks, and the delete operation expands a stored size of the second data block to account for a difference in size between the second data block and the first data block.

15. The system of claim 14, wherein the stored size of the second data block is expanded by storing the overhead information within the second data block in addition to the historical information.

16. The system of claim 11, wherein the delete operation stores a new error-detecting code associated with the second data block to replace an error-detecting code associated with the first data block.

17. The system of claim 11, wherein the operations include an add operation that stores a data unit to be added in association with a set of recently added data units.

18. The system of claim 17, wherein the processor is further configured to compress the set of recently added data units as a compressed data block stored in the storage medium.

19. The system of claim 1, wherein the data storage system is configured to store overhead information identifying the data blocks in the group as conforming to a predetermined storage format.

20. The system of claim 19, wherein the overhead information includes an identifier in a header of each data block in the group identifying the predetermined storage format.

21. The system of claim 19, wherein the first read operation is compatible with the predetermined storage format.

22. A system for managing storage of data units, the system including:
   means for storing multiple data blocks, at least some of the data blocks containing multiple data units, with at least a group of the data blocks being stored contiguously, thereby supporting a first read operation that retrieves data units from at least two adjacent data blocks in the group; and
   means for performing one or more operations with respect to data units, the operations including a delete operation that replaces a first data block containing a data unit to be deleted with a second data block that does not contain the deleted data unit, and stores information about the deleted data unit and overhead information, both the information about the deleted data unit and the overhead information being stored within the second data block, and the size of the overhead information being dependent on the size of the information about the deleted data unit so that the second data block has the same size as the first data block after the information about the deleted data unit and the overhead information are stored within the second data block.

23. A method for managing storage of data units, the method including:
storing multiple data blocks in a data storage system, at least some of the data blocks containing multiple data units, with at least a group of the data blocks being stored contiguously, thereby supporting a first read operation that retrieves data units from at least two adjacent data blocks in the group; and
performing, using at least one processor, one or more operations with respect to data units, the operations including a delete operation that replaces a first data block containing a data unit to be deleted with a second data block that does not contain the deleted data unit, and stores information about the deleted data unit and overhead information, both the information about the deleted data unit and the overhead information being stored within the second data block, and the size of the overhead information being dependent on the size of the information about the deleted data unit so that the second data block has the same size as the first data block after the information about the deleted data unit and the overhead information are stored within the second data block.

24. Software stored on a computer-readable medium, for managing storage of data units, the software including instructions for causing a computing system to:
store multiple data blocks in a data storage system, at least some of the data blocks containing multiple data units, with at least a group of the data blocks being stored contiguously, thereby supporting a first read operation that retrieves data units from at least two adjacent data blocks in the group; and
perform one or more operations with respect to data units, the operations including a delete operation that replaces a first data block containing a data unit to be deleted with a second data block that does not contain the deleted data unit, and stores information about the deleted data unit and overhead information, both the information about the deleted data unit and the overhead information being stored within the second data block, and the size of the overhead information being dependent on the size of the information about the deleted data unit so that the second data block has the same size as the first data block after the information about the deleted data unit and the overhead information are stored within the second data block.

25. The method of claim 23, wherein the second data block is adjacent to a data block that was adjacent to the first data block within the data storage system.

26. The method of claim 23, wherein the second data block is stored in the same storage space as the first data block.

27. The method of claim 23, wherein the delete operation maintains data blocks other than the first data block in the same storage locations within the data storage system in which they were stored before the delete operation was performed.

28. The method of claim 23, wherein the data storage system is configured to store, for at least some of the data blocks, corresponding historical information about prior removal of one or more data units from that data block, the removal affecting at least some addresses of data units in that data block.

29. The method of claim 28, wherein the operations include a second read operation, different from the first read operation, that accesses at least a first data unit stored in a particular data block according to address information interpreted based on any stored historical information corresponding to the particular data block.

30. The method of claim 28, wherein the delete operation stores the information about the deleted data unit in historical information corresponding to the second data block.

31. The method of claim 28, wherein at least some of the historical information is stored in the data storage system.

32. The method of claim 31, wherein at least a portion of the historical information is interleaved between different data blocks.

33. The method of claim 31, wherein at least a portion of historical information corresponding to a particular data block is stored in a predetermined portion of that particular data block.

34. The method of claim 23, wherein at least some of the data blocks are compressed data blocks.

35. The method of claim 34, wherein the second read operation decompresses a particular compressed data block to recover a set of decompressed data units and retrieves the data unit to be read at a particular offset from a reference location based at least in part on the historical information corresponding to that particular compressed data block.

36. The method of claim 34, wherein the first read operation decompresses multiple compressed data blocks and reads multiple decompressed data units sequentially.

37. The method of claim 34, wherein the first and second data blocks are compressed data blocks, and the delete operation expands a stored size of the second data block to account for a difference in size between the second data block and the first data block.

38. The method of claim 37, wherein the stored size of the second data block is expanded by storing the overhead information within the second data block in addition to the historical information.

39. The method of claim 34, wherein the delete operation stores a new error-detecting code associated with the second data block to replace an error-detecting code associated with the first data block.

40. The method of claim 34, wherein the operations include an add operation that stores a data unit to be added in association with a set of recently added data units.

41. The method of claim 40, wherein the processor is further configured to compress the set of recently added data units as a compressed data block stored in the storage medium.

42. The method of claim 23, wherein the data storage system is configured to store overhead information identifying the data blocks in the group as conforming to a predetermined storage format.

43. The method of claim 42, wherein the overhead information includes an identifier in a header of each data block in the group identifying the predetermined storage format.

44. The method of claim 42, wherein the first read operation is compatible with the predetermined storage format.

45. The software of claim 24, wherein the second data block is adjacent to a data block that was adjacent to the first data block within the data storage system.

46. The software of claim 24, wherein the second data block is stored in the same storage space as the first data block.

47. The software of claim 24, wherein the delete operation maintains data blocks other than the first data block in the same storage locations within the data storage system in which they were stored before the delete operation was performed.

48. The software of claim 24, wherein the data storage system is configured to store, for at least some of the data blocks, corresponding historical information about prior removal of one or more data units from that data block, the removal affecting at least some addresses of data units in that data block.

49. The software of claim 48, wherein the operations include a second read operation, different from the first read operation, that accesses at least a first data unit stored in a particular data block according to address information interpreted based on any stored historical information corresponding to the particular data block.

50. The software of claim 48, wherein the delete operation stores the information about the deleted data unit in historical information corresponding to the second data block.

51. The software of claim 48, wherein at least some of the historical information is stored in the data storage system.

52. The software of claim 51, wherein at least a portion of the historical information is interleaved between different data blocks.

53. The software of claim 51, wherein at least a portion of historical information corresponding to a particular data block is stored in a predetermined portion of that particular data block.

54. The software of claim 24, wherein at least some of the data blocks are compressed data blocks.

55. The software of claim 54, wherein the second read operation decompresses a particular compressed data block to recover a set of decompressed data units and retrieves the data unit to be read at a particular offset from a reference location based at least in part on the historical information corresponding to that particular compressed data block.

56. The software of claim 54, wherein the first read operation decompresses multiple compressed data blocks and reads multiple decompressed data units sequentially.

57. The software of claim 54, wherein the first and second data blocks are compressed data blocks, and the delete operation expands a stored size of the second data block to account for a difference in size between the second data block and the first data block.

58. The software of claim 57, wherein the stored size of the second data block is expanded by storing the overhead information within the second data block in addition to the historical information.

59. The software of claim 54, wherein the delete operation stores a new error-detecting code associated with the second data block to replace an error-detecting code associated with the first data block.

60. The software of claim 54, wherein the operations include an add operation that stores a data unit to be added in association with a set of recently added data units.

61. The software of claim 60, wherein the processor is further configured to compress the set of recently added data units as a compressed data block stored in the storage medium.

62. The software of claim 24, wherein the data storage system is configured to store overhead information identifying the data blocks in the group as conforming to a predetermined storage format.

63. The software of claim 62, wherein the overhead information includes an identifier in a header of each data block in the group identifying the predetermined storage format.

64. The software of claim 62, wherein the first read operation is compatible with the predetermined storage format.

65. The system of claim 1, wherein at least some of the overhead information is stored in a variable-length field.

66. The method of claim 23, wherein at least some of the overhead information is stored in a variable-length field.

67. The software of claim 24, wherein at least some of the overhead information is stored in a variable-length field.

\* \* \* \* \*